(12) United States Patent
Zhang et al.

(10) Patent No.: US 9,108,316 B2
(45) Date of Patent: Aug. 18, 2015

(54) METHOD AND SYSTEM FOR IN-PRODUCTION OPTIMIZATION OF THE PARAMETERS OF A ROBOT USED FOR ASSEMBLY

(75) Inventors: George Zhang, Windsor, OH (US); Arnold Bell, Brighton, MI (US); Jianjun Wang, West Hartford, CT (US); Jianmin He, Bellevue, WA (US); Carlos Martinez, West Hartford, CT (US)

(73) Assignee: ABB Research Ltd., Zurich (CH)

( * ) Notice: Subject to any disclaimer, the term of this patent is extended or adjusted under 35 U.S.C. 154(b) by 1458 days.

(21) Appl. No.: 12/331,503

(22) Filed: Dec. 10, 2008

(65) Prior Publication Data
US 2010/0145509 A1 Jun. 10, 2010

(51) Int. Cl.
B25J 9/00 (2006.01)
B25J 9/16 (2006.01)
G05B 13/02 (2006.01)

(52) U.S. Cl.
CPC ............ B25J 9/1687 (2013.01); *G05B 13/024* (2013.01); *G05B 2219/36401* (2013.01); *G05B 2219/39102* (2013.01); *G05B 2219/45064* (2013.01)

(58) Field of Classification Search
CPC ............ G05B 19/41805; G05B 13/0205; G05B 13/02; G05B 13/021; G05B 13/024
USPC ............ 700/32, 28, 47, 104, 245–264
See application file for complete search history.

(56) References Cited

U.S. PATENT DOCUMENTS

| | | | | |
|---|---|---|---|---|
| 5,475,797 | A * | 12/1995 | Glaspy et al. | 700/247 |
| 6,553,652 | B2 * | 4/2003 | Sakakibara et al. | 29/709 |
| 7,123,990 | B2 * | 10/2006 | Thelen | 700/245 |
| 2001/0044661 | A1 * | 11/2001 | Kaji et al. | 700/28 |
| 2007/0067056 | A1 * | 3/2007 | Nishinohara et al. | 700/97 |
| 2007/0106421 | A1 * | 5/2007 | Kamrani et al. | 700/245 |
| 2007/0244599 | A1 * | 10/2007 | Tsai et al. | 700/245 |
| 2008/0221733 | A1 * | 9/2008 | Morrow et al. | 700/258 |

FOREIGN PATENT DOCUMENTS

| | | |
|---|---|---|
| EP | 2008085937 | 7/2008 |
| GB | 2246216 | 1/1992 |
| WO | PCT/US2009/067125 | 8/2009 |

* cited by examiner

*Primary Examiner* — Thomas G Black
*Assistant Examiner* — Peter D Nolan
(74) *Attorney, Agent, or Firm* — Michael M. Rickin (57) ABSTRACT

A robot is used to repeatedly assemble parts during a continuous production run of parts to be assembled. There are parameters of the robot associated with the assembly. These parameters are used to assemble the parts. Simultaneously with that repeated assembly the robot parameters are optimized. The parts to be assembled have a starting position for the assembly and the simultaneous optimization of the robot assembly parameters also includes the learning of the starting position. The robot assembly parameters can be optimized in a predefined manner. The optimized parameters can then be verified and the optimized and verified robot assembly parameters may then be used in place of the parameters of the robot associated with the parts assembly along with the learned starting position.

12 Claims, 5 Drawing Sheets

METHOD AND SYSTEM FOR IN-PRODUCTION OPTIMIZATION OF THE PARAMETERS OF A ROBOT USED FOR ASSEMBLY

FIELD OF THE INVENTION

This invention relates to robotic assembly and more particularly to in-production optimization of the parameters associated with such assembly.

DESCRIPTION OF THE PRIOR ART

Industrial robots with force control are used more and more in assembly applications in both the automotive and general industries. These assembly applications involve the robot assembling the same set of parts in continuous product runs. For example and without limitation, the robot may be assembling the parts used in an automobile transmission or other powertrain components.

U.S. Pat. Nos. 6,553,652 and 7,181,314 describe the use of an industrial robot with force control to perform tight-tolerance assembly tasks that cannot be performed by a conventional industrial robot with position control. However, since the introduction of force control, in which the actual robot path depends not only on the programmed position but also on the interaction force between the assembled parts/components (hereinafter "parts"), the optimal set of robotic (force control) parameters is often obtained either by trial and error or offline analysis tools. This parameter selection process is tedious and time consuming.

The Patent Cooperation Treaty ("PCT") application published as WO2008/085937 ("the PCT Application"), discloses a method and system for robotic assembly parameter optimization. As disclosed therein, a force controlled robotic assembly process is first categorized into different assembly types such as cylindrical, radial and multi-staged. Then each type of assembly is further parameterized into robotic assembly parameters such as Search Force, Rotation Angle, Rotation speed, Force Amplitude, Force Period, and so on.

In the robotic assembly parameter optimization methods and systems described above, the optimization process needs to be performed prior to the use of the robot in the assembly process. The optimization experiments need to be performed off-line and a limited number of parts are used in the experiments. Therefore the optimization results can be close to but not exactly correct for the production environment since there are manufacturing variations and differences in the assembly cell setup. Furthermore, some production related process parameters such as assembly starting position cannot be obtained prior to production. Thus in-production assembly parameter optimization is desired. The present invention provides an in-production or, as it is sometimes called, an on-line robotic assembly parameter optimization.

SUMMARY OF THE INVENTION

A system for, during a continuous production run of first and second parts to be assembled together, continuously assembling a respective one of the first parts to an associated one of the second parts, each of the first and second parts to be assembled having an associated starting position. The system has:

an industrial robot for assembling the respective one of the first parts to the associated one of the second parts, the robot taught prior to starting continuously assembling the respective one of the first parts to the associated one of the second parts the associated starting position for the first and second parts;

a computing device in communication with the robot that has in it program code usable by the computing device for controlling the robot to continuously assemble the respective one of the first parts to the associated one of the second parts, the code having:

code configured to use the associated starting position for the first and second parts that is taught to the robot prior to the robot starting to continuously assemble the respective one of the first parts to the associated one of the second parts;

code configured to when prompted by an operator of the robot optimize, during the continuous assembly of the respective one of the first parts to the associated one of the second parts using the taught associated starting positions of the first and second parts, the taught associated starting positions of the first and second parts to learn a new starting position for the first and second parts by performing a predefined number of starting position learning runs that uses a predetermined starting position technique;

code configured to record in the computing device the result when completed of each of the predefined number of starting position learning runs; and code configured to analyze the each of the starting position learning run results when the predefined number of starting position learning runs are completed to arrive at a new starting position for the first and second parts.

A system for, during a continuous production run of first and second parts to be assembled together, continuously assembling a respective one of the first parts to an associated one of the second parts, each of the first and second parts to be assembled having associated parameters for assembling the first and second parts, the system comprising:

an industrial robot for continuously assembling the respective one of the first parts to the associated one of the second parts;

a computing device in communication with the robot, the computing device having therein program code usable by the computing device for controlling the robot to continuously assemble the respective one of the first parts to the associated one of the second parts, the code comprising:

code configured to use the associated assembling parameters for the first and second parts to continuously assemble the respective one of the first parts to the associated one of the second parts;

code configured to when prompted by an operator of the robot optimize, during the continuous assembly of the respective one of the first parts to the associated one of the second parts using the associated parameters for continuously assembling the first and second parts, the associated parameters for assembling the first and second parts to obtain optimized parameters for assembling the first and second parts by performing a predefined number of assembling parameter optimization runs that uses a predetermined assembly parameter optimization technique; and code configured to process in the computing device the result when completed of each of the predefined number of assembling parameter optimization runs.

A system for, during a continuous production run of first and second parts to be assembled together, continuously assembling a respective one of the first parts to an associated one of the second parts, each of the first and second parts to be assembled having an associated starting position and associated parameters for assembling the first and second parts, the system comprising:

an industrial robot for continuously assembling the respective one of the first parts to the associated one of the second parts;

a computing device in communication with the robot, the computing device having therein program code usable by the computing device for controlling the robot to continuously assemble the respective one of the first parts to the associated one of the second parts, the code comprising:

code configured to use the starting position for the first part and the parameters for continuously assembling the first and second parts to continuously assemble the respective one of the first parts to the associated one of the second parts;

code configured to when prompted by an operator of the robot verify, during the continuous assembly of the respective one of the first parts to the associated one of the second parts, the starting position for the first part and/or the parameters for continuously assembling the first and second parts to continuously assemble the respective one of the first parts to the associated one of the second parts using a predefined number of verification experiments; and code configured to process in the computing device the result when completed of the predefined number of experiments.

DETAILED DESCRIPTION

Figure 1:
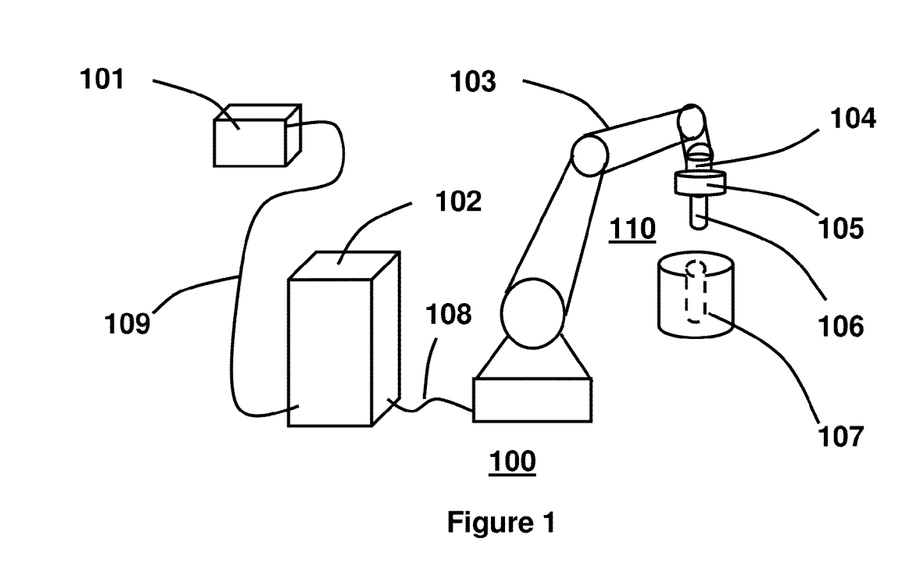
FIG. 1 shows the setup of a robotic assembly cell in which the present invention can be used.

Referring now to FIG. 1, there is shown the setup of a robotic assembly cell 100 in which the present invention can be used. In the cell 100 there is a teach pendant 101 with its own CPU, a robot controller 102 with one or more CPUs and a robot 110. The robot 110 has a robot arm 103, a force sensor 104 mounted on the robot 110 adjacent a grip tool 105 held by the robot 110, and a part 106 held by grip tool 105 for inserting into part 107. Part 106 is also known as the inserting part and part 107 is also known as the inserted part. The cell 100 also has a motion control link and sensor connection 108 between the robot arm (103 110 and controller 102, and a communication connection 109 between the teach pendant 101 and the controller 102.

Figure 2:
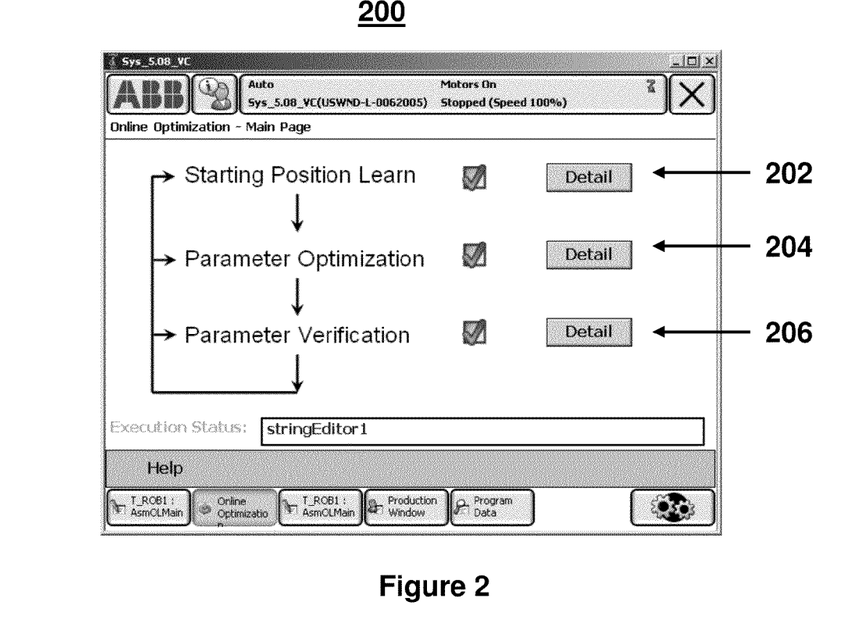
FIG. 2 shows the main page of the user interface on a teach pendant for the in-production (or on-line) robotic assembly parameter optimization process of the present invention.

FIG. 2 shows the main page 200 of the user interface on the teach pendant 101 for the in-production parameter optimization tool of the present invention. This page shows the optimization process flow. As is shown in FIG. 2, that process flow is a loop that starts with the learning of the Position or other process related parameter that is to be optimized, which is then followed by the parameter optimization and parameter verification. The loop can be repeatedly executed.

Four subsections are included herein to describe the present invention. These subsections are: 1) the method and system to setup and switch between production and parameter optimization runs; 2) the method to select the parameter boundaries and constraints including robot search parameters, assembly termination condition and assembly starting position; 3) the method to optimize the parameters; and 4) the method to optimize general process parameters such as starting position. All of these methods are performed either on the robot teach pendent 101 or a PC, not shown in FIG. 1, connected to controller 102.

1) The method and System to Setup and Switch Between Production and Parameter Optimization Runs The setup and switching method and system includes the graphical user interface on the robot teach pendant 101 or a PC connected to controller 102, the main page 200 of which is shown in FIG. 2, and the mapping between the designed optimized parameter values and run-time values and supervisions and/or switches for the in-production parameter optimization. The designed parameters are generated from the teach pendant 101 or a PC connected to controller 102 and are mapped to the parameters in the controller 102 for the robot assembly process to use. The flow diagram shown in FIG. 3, which is described below, is part of this mapping.

FIG. 2 shows three boxes named from top to bottom "Starting Position Learn" 202, "Parameter Optimization" 204 and "Parameter Verification" 206. Each of these three boxes 202, 204 and 206 are shown in FIG. 2 with a 30 check mark because in this example the operator of the robot assembly cell 100 wants to use all of the in-production or on-line functions of the present invention, namely to learn the starting position parameters associated with the parts to be assembled by the robot 110, optimize the assembly parameters and verify that the optimized assembly parameters and the learned starting position parameters are to be used for the next round of production runs. When none of the three boxes are checked, the robot system uses the production parameters to perform the assembly task.

When the user requests the execution of an in-production parameter optimization/learning task, for example, by checking the box for Starting Position Learn 202, a predefined number of learning runs are conducted with the production parameter set and the positional information is recorded and stored. The criteria for setting the number of predefined learning runs is the random deviation between the taught start position of the assembling or as is it also known as the inserting part and the coming-in part, that is the assembled or as it is sometime known as the inserted part, location at the assembly station on the production line and the desired accuracy of the learning. The assembled parts are coming in continuously from the production line.

As is well known, the higher the number of learning runs the better is the accuracy of the results. What is learned during the learning runs are the starting position parameters associated with the real world parts to be assembled. One example of a technique for learning the starting position parameters from the assembly end position is described below in subsection 4.

Figure 5:
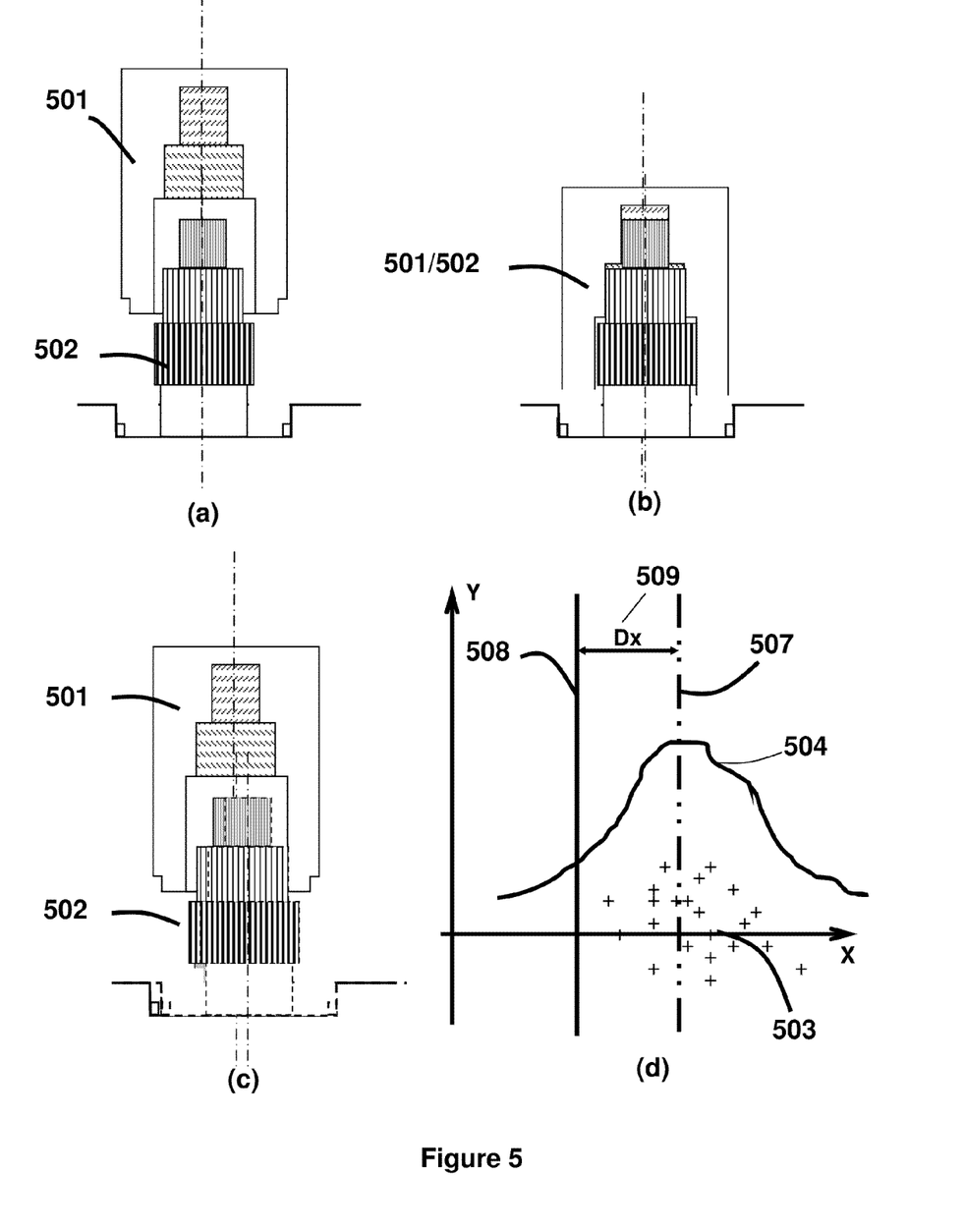
FIG. 5(a) shows the relationship between the two parts to be assembled by a robot.
FIG. 5(b) shows the two parts after they are assembled.
FIG. 5(c) shows the variation of the relative position of the parts to be assembled prior to their assembly.
FIG. 5(d) shows the distribution of the X locations of that one of the two parts to be assembled whose position can vary prior to assembly.

The data is analyzed after the learning runs are completed in teach pendant 101 or a PC connected to controller 102 using the method described below. The result of the analysis is presented graphically on a display device such as the teach pendant 101. FIGS. 5(a) to 5(d) described in more detail below shows the parts to be assembled and their relationship before, during and after assembly and the distribution of the X locations of that one of the two parts to be assembled whose position can vary prior to assembly. Therefore, the display could be the X, Y, Z coordinates and the orientation of the assembling end position (the cloud of plus signs 503 shown in FIG. 5(*d*)), their mean values and the taught starting position X values 508 of FIG. 5(*d*) and the Y values. FIG. 5(*d*) only shows values related to the X component as an example. A similar picture could be shown for the Y and Z coordinates of the position. The orientation (q1, q2, q3 and q4 in quaternion or Az, Ay and Ax in Euler system) is difficult to be shown graphically but the mean value of the orientation of the 10 end positions can be calculated and used to correct the starting position's orientation.

When the parameter optimization box 204 is checked, the assembly parameter values are varied in a predefined manner during the optimization runs and the values and the resulting cycle time and/or success rate may be stored in a data file for later processing. The predefined manner for varying the assembly parameter values, that is, the optimization method, may, for example, be the well known Design of Experiments (DOE) method described in detailed in the PCT Application. The user of the present invention has the ability to vary the selected optimization method or change to another optimization method through the setup interface. The parameter optimization is performed in parallel with the production operation. The parameter optimization can be set to be performed automatically and thus performed continuously or as is described below with reference to the flow diagram of FIG. 3 under operator supervision.

There are a predefined number of optimization runs which are determined by the predefined manner, for example DOE, and are based on the number of parameters to be optimized and the levels of the parameter values that are varied within a certain range to find the values that are the best in a statistical sense. After the predefined number of optimization runs are completed, the system automatically returns to the production parameter set and continues the normal production operation. At the same time, the data arising from the optimization runs is processed on a CPU in the teach pendant 101 or another computational device such as a PC connected to controller 102 using the method described in a later section of this Detailed Description.

When the box for Parameter Verification 206 is checked, the verification process is executed. The parameter verification process uses the starting position and/or parameter set obtained from the position learning and parameter optimization. A relatively large number of repeated experiments for the parameter verification process, such as for example one hundred, are necessary to obtain results that are statistically reasonable. The data processing and presenting methods are described below.

The parameter verification process of the method and system of the present invention determines if the optimized parameters and learned starting positions are to be used for the next round of production runs. The indicators used in making the determination are the assembly cycle time and the change in the assembly success rate threshold. A cycle time that is lower is better than a higher cycle time while the assembly success rate that is higher is better than a lower success rate. The current and previous parameter/position data are stored in a file. A supervision option is also provided to allow the operator to determine if the optimized parameters are used in the next round of optimization process. This option is shown in detail in FIG. 3.

Figure 3:
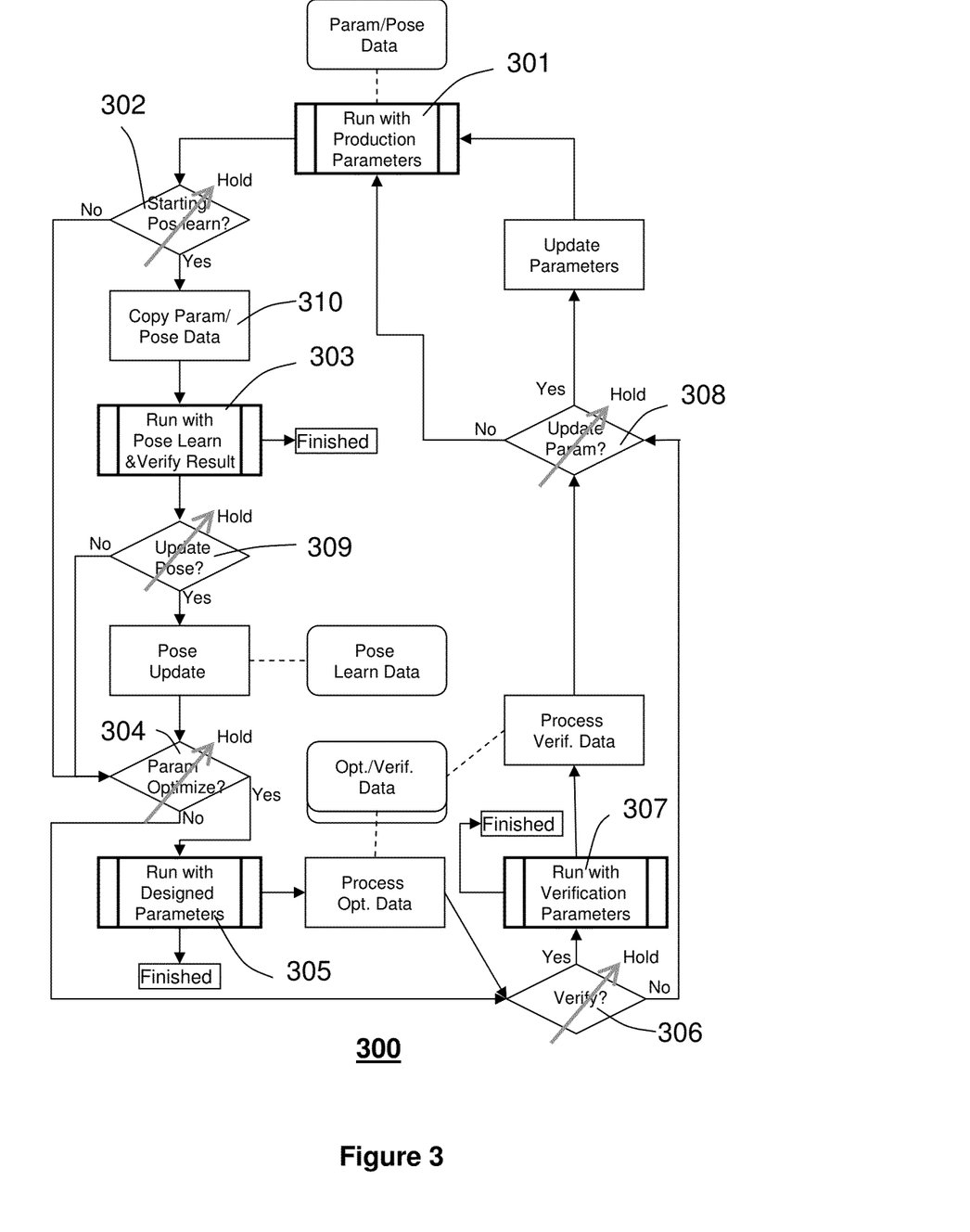
FIG. 3 shows a flow diagram for the learning, optimization and parameter verification processes of the present invention.

FIG. 3 shows the learning, optimization and parameter verification processes flow diagram 300 of the system. The robot assembly system 100 normally runs with the production parameters (301). If the answer to Starting Pos Learn query (302) is set to Yes, the existing parameter and starting position data is copied from a file into the system (310) and the system runs in the learning mode and the learned result is verified (303). The indicators used in verifying the learned result are the same as those used in verifying the optimization result, namely, the assembly cycle time and the change in the assembly success rate threshold.

When the learning runs are finished, that is, verified, the system returns to its normal production run and asks in query (309) if the starting position is to be 10 updated to the new value. If the answer is Yes, the starting position is updated with the learned data and the process proceeds to the parameter optimization query 304. If the answer to 309 is No, the starting position remains unchanged and the system proceeds directly to the Parameter Optimization query 304.

If the answer to the parameter optimization query 304 is Yes, the parameter optimization is performed in 305. When the parameter optimization runs are finished the system returns to normal production runs and uses the optimized parameters only if the switch of the parameter Verify query 306 is No and the switch of the Update Param query 308 is Yes. Otherwise the production parameters are used after the optimization runs. The optimization data is processed and the result is stored in a file. If the answer to the parameter optimization question 304 is No, the parameter optimization is skipped.

When the answer to Parameter Verification 306 is Yes, the verification runs 307 are conducted. At the end of the verification runs, the system is switched back to the normal production run. The verification data is stored and processed and the process proceeds to the next question 308 which is should the production parameters be updated? If the answer to 306 is No, the verification process 307 is skipped and the process proceeds directly from query 306 to query 308. If the answer to the updating the parameter query 308 is Yes, the production parameters are updated to the optimized parameters. If the answer to 308 is No, the production run continues with the existing parameters. The optimization/learning process can be repeated as the batch and other production environments change. As was described above, the method used in verifying the parameter optimization result is also the same method that is used for verifying the learning result.

As is shown in FIG. 3, all of the question switches 302, 304, 306, 308 and 309 have three states: Yes, No and Hold. The Hold state is used to provide the operator supervision feature. If the Hold state is set for a switch, the system is returned to the production runs and the operator is asked to input Yes or No to the question switch that has the set Hold state in order to continue the optimization process. As a default, whenever the current experiment runs are finished, the system returns back to the normal production run unless the next step of the learning, optimization or verification process is set.

It should be appreciated that in the present invention as is shown by the flow diagram of FIG. 3, if there is a Hold state set for one of the question switches 302, 304, 306, 308 and 309, the process proceeds to the next enabled task and if no other tasks are enabled the robot 110 runs with the production parameters. For example, if question switch 302 is Yes the process performs the learning mode functions of copying of the parameter/pose data 310 and the running with that data and verifying the learned result 303 and if question switch 309 is a Hold the process skips to question switch 304 which if a Hold then skips to question switch 306 which if a Hold skips to question switch 308 which if a Hold results in the process running with the production parameters. Thus as can be appreciated, a Hold state is a No state put into place by the operator.

It should also be appreciated that the technique of the present invention is running during the production and the user can direct the process flow by use of the switches. When all the question switches 302, 304, 306 308 and 309 are set to No or Hold, the system runs with the default production parameters.

2) The Method to Setup the Parameter Boundaries and Constraints

One of the major differences between the off-line assembly parameter optimization that is disclosed in the PCT Application and the present invention of in-production assembly parameter optimization is that in the present invention parameter boundaries and other constraints are more important than in the prior art off-line optimization. Therefore, the variation of the assembly parameters should be controlled to minimize the impact to the normal production throughput and assembly quality.

However, if the variation of the assembly parameters is too small, they may not be distinguished from the manufacturing system noises. Thus the optimized result may not reflect the nature of the real system. If the variation of those parameters is too large, the normal production could be interrupted to a considerable degree, causing an unacceptable failure rate and/or a long cycle time.

Constraints are also needed to be applied to some of the variables such as for example maximum searching force, the minimum value of the robot force control damping factor. Those constraints are necessary for the system to have the assembly quality fall within predetermined boundaries. These parameter boundaries and variable constraints can only be obtained from the real-world manufacturing process.

Figure 4:
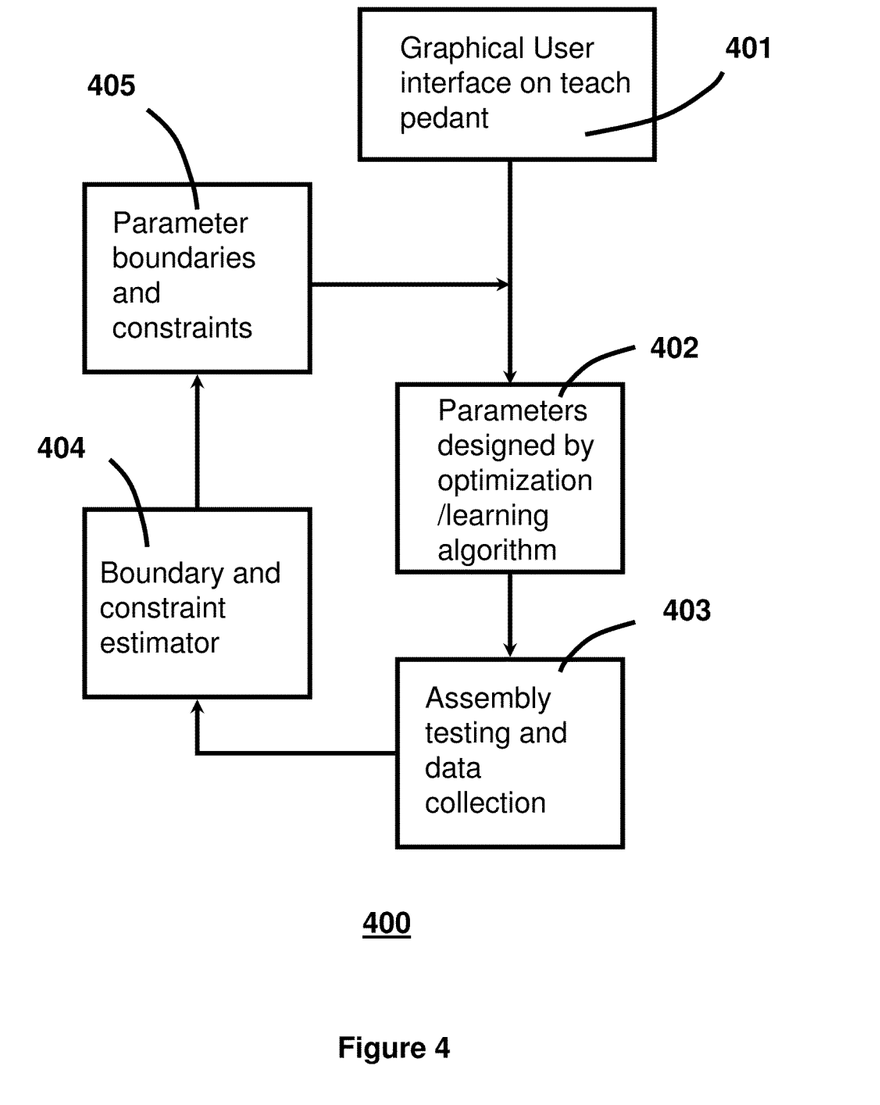
FIG. 4 shows a block diagram of the method to determine the parameter boundaries and variable constraints to be used in the method of the present invention.

FIG. 4 shows a flow chart in block diagram form of the method 400 to determine the parameter boundaries and the variable constraints. The parameters and process variables are setup by the user through the graphical user interface 401 on teach pendant 101 or on another display device, such as that associated with a PC connected to controller 102, by applying at 405 the initial parameter boundary and variable constraint. After the setup, the parameters are varied at 402 within their boundary values by use of experiment design methods such as the DOE method or other optimization techniques.

Real-case testing 403 is conducted and the resultant data is collected and recorded. The data is then fed into an estimator 404 to obtain a new set of parameter boundaries and variable constraints. The estimator 404 determines if the data meets the criteria described in the paragraph above and if not the estimator 404 provides a new set of parameter boundaries and variable constraints that can meet that criteria. This process can be repeated until a set of process dependent parameter boundaries and constraints are obtained. The user can overrule the estimator's parameter boundary values by using the graphical user interface 401.

3) The Method to Optimize the Force Control Assembly Parameters

Any optimization technique can be used in this in-production parameter optimization. The well known DOE (Design Of Experiments) method, described in detail in the PCT Application, is an example of one such optimization technique.

4) The Method to Optimize General Process Parameters Such as Starting Position

In addition to the basic robotic force control assembly parameters (for searching and insertion), there are other assembly process parameters such as starting position that can be optimized (improved or learned) during production. Starting position is used as an example in FIG. 5 to illustrate the learning process.

FIG. 5(a) shows the relationship between the inserting part 501 and the inserted part 502; 5(b) shows that relationship when the parts 501 and 502 are assembled; 5(c) illustrates the variation of the relative positions of the parts 501 and 502 at the beginning of the assembly while the starting position of the inserting part 501 is fixed (taught) but the position of the inserted part 502 is varied since the pallet (not shown in FIG. 5) which carries the inserted part 502 comes into the work cell 100 in FIG. 1 with variations in its X-Y locations. When the assembly process is finished, referencing FIG. 5(b), the inserting part 501 matches the inserted part 502 in the X-Y coordinate as a result of the flexible behavior of the force controlled robot. Therefore, the final position can be recorded.

Using a statistical method, the actual mean and deviation of the X-Y position at the end of insertion for the inserted part 502 can be calculated. This data is used to modify the starting position of the inserting part 501 to get a better estimation of the "right" X-Y positions for a quick and a statistically higher success rate and shorter assembly cycle time.

FIG. 5(d) illustrates the distribution of the X locations of the inserted part 502. The plus signs 503 illustrate the recorded end positions of part 502 in a number of different assembly operations and the curve 504 shows the distribution that is derived from those end positions for the X-coordinate. The assembly start position is taught and relatively fixed in space. That position is indicated by the solid line 508. The distance between the X-coordinate of the starting position 508 and the X-coordinate of the average end position as indicated by the dashed line 507 is Dx 509. Thus the X coordinate of the starting position of inserted part 502 can be shifted to the left by Dx to obtain a more accurate assembly starting position. For positions in the Y-coordinate, a similar analysis can be applied to derive the shifting distance Dy (not shown in FIG. 5(d) for the Y-coordinate.

Figure 6:
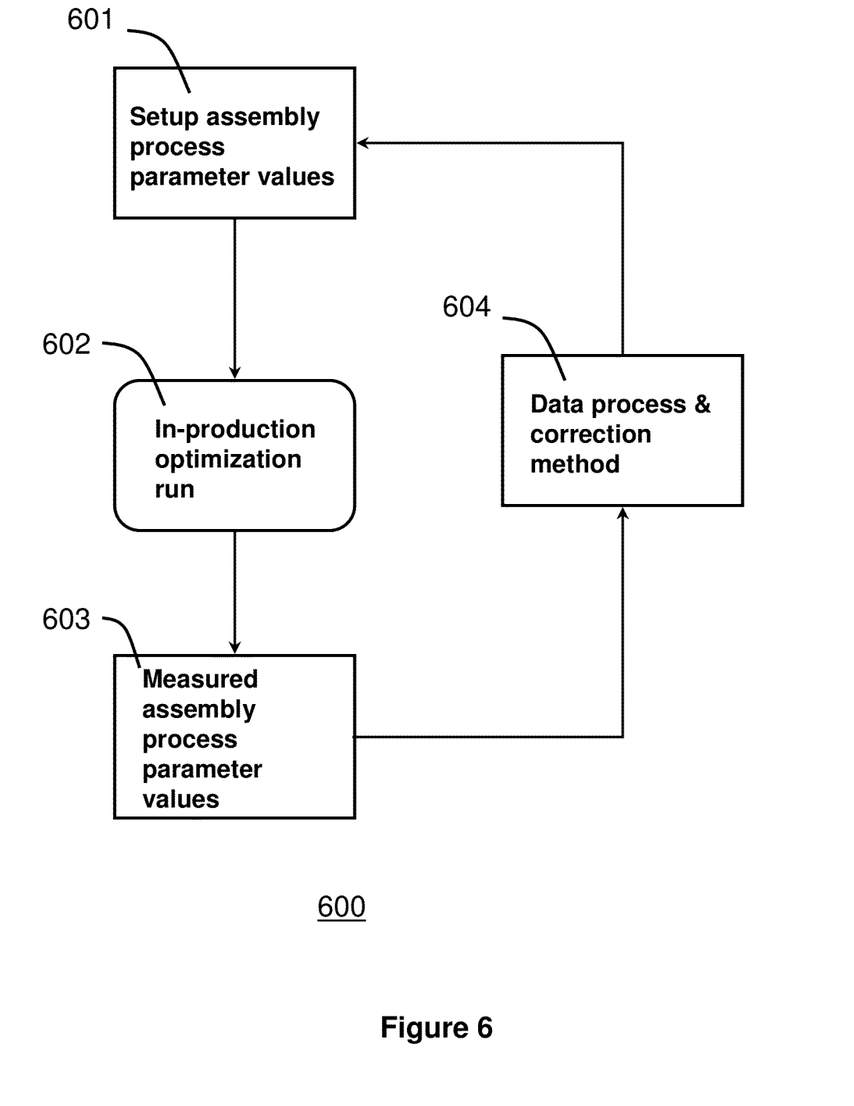
FIG. 6 shows a flow chart that summarizes the present invention.

Referring now to FIG. 6, there is shown in flow chart 600 a summary of the method and system of the present invention. As described above, there are process parameters with starting values 601. The designed in-production optimization/learning runs 602 use this set of process parameters in their execution. The output of the runs are measured by 603 and feed into a data processing and correction module 604. The corrected parameter values are used as the starting values for the second round of optimization/learning operation. This process can be repeated until desired parameter values obtained.

As can be appreciated by one of ordinary skill in the art, the present invention may take the form of a computer program product on a computer-usable or computer-readable tangible medium having computer-usable program code embodied in the medium. The computer-usable or computer-readable medium may be any tangible medium that can contain, store, communicate, propagate, or transport the program for use by or in connection with the instruction execution system, apparatus, or device and may by way of example but without limitation, be an electronic, magnetic, optical, electromagnetic, infrared, or semiconductor system, apparatus, device, or even be paper or other suitable medium upon which the program is printed. More specific examples (a non-exhaustive list) of the computer-readable medium would include: a portable computer diskette, a flash drive, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the present invention may be written in an object oriented programming language such as Java, Smalltalk, C++ or the like, or may also be written in conventional procedural programming languages, such as the "C" programming language, and robot program language such as "RAPID" —an ABB proprietary robot program language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for, during a continuous production run of first and second parts to be assembled together, continuously assembling a respective one of said first parts to an associated one of said second parts, each of said first and second parts to be assembled having an associated starting position, said system comprising:
   an industrial robot for assembling said respective one of said first parts to said associated one of said second parts, said robot taught prior to starting continuously assembling said respective one of said first parts to said associated one of said second parts said associated starting position for said first and second parts;
   a computing device in communication with said robot, said computing device having therein program code usable by said computing device for controlling said robot to continuously assemble said respective one of said first parts to said associated one of said second parts, said code comprising:
   code configured to use said associated starting position for said first and second parts that is taught to said robot prior to said robot starting to continuously assemble said respective one of said first parts to said associated one of said second parts;
   code configured to when prompted by an operator of said robot optimize, during said continuous assembly of said respective one of said first parts to said associated one of said second parts using said taught associated starting positions of said first and second parts, said taught associated starting positions of said first and second parts to learn a new starting position for said first and second parts by performing a predefined number of starting position learning runs;
   code configured to record in said computing device the result when completed of each of said predefined number of starting position learning runs that uses a predetermined starting position technique; and
   code configured to analyze said each of said starting position learning run results when said predefined number of starting position learning runs are completed to arrive at said new starting position for said first and second parts.

2. The system of claim 1 wherein said code is configured to verify said new starting position for said first and said second parts using predetermined indicators.

3. The system of claim 1 wherein said program code in said computing device is configured to when prompted by said operator of said robot use said new starting position for said first parts as the starting position for continuing to continuously assemble said respective one of said first parts to said associated one of said second parts.

4. The system of claim 1 wherein each of said first and second parts to be assembled have associated parameters for assembling said first and second parts and said code is configured to use said associated parameters for assembling said first and second parts to continuously assemble said respective one of said first parts to said associated one of said second parts.

5. The system of claim 4 wherein said code is further configured to when prompted by said operator of said robot during said continuous assembly of said respective one of said first parts to said associated one of said second parts using said associated parameters for assembling said first and second parts, optimize said associated parameters for assembling said first and second parts to obtain new assembling parameters by said robot performing a predefined number of assembling parameter optimization runs.

6. A system for, during a continuous production run of first and second parts to be assembled together, continuously assembling a respective one of said first parts to an associated one of said second parts, each of said first and second parts to be assembled having associated parameters for assembling said first and second parts, said system comprising:
   an industrial robot for continuously assembling said respective one of said first parts to said associated one of said second parts;
   a computing device in communication with said robot, said computing device having therein program code usable by said computing device for controlling said robot to continuously assemble said respective one of said first parts to said associated one of said second parts, said code comprising:
   code configured to use said associated assembling parameters for said first and second parts to continuously assemble said respective one of said first parts to said associated one of said second parts;
   code configured to when prompted by an operator of said robot optimize, during said continuous assembly of said respective one of said first parts to said associated one of said second parts using said associated parameters for assembling said first and second parts, said associated parameters for continuously assembling said first and second parts to obtain optimized parameters for assembling said first and second parts by performing a predefined number of assembling parameter optimization runs that uses a predetermined assembly parameter optimization technique; and
   code configured to process in said computing device the result when completed of each of said predefined number of assembling parameter optimization runs.

7. The system of claim 6 wherein said program code in said computing device is further configured to when prompted by said operator of said robot use said optimized parameters for assembling said first and second parts for continuing to assemble said respective one of said first parts to said associated one of said second parts.

8. The system of claim 6 wherein said program code in said computing device is further configured to vary during said performing of said predefined number of assembling parameter optimization runs said parameters for assembling said first and second parts using a predefined method.

9. The system of claim 8 wherein said predefined method is used by said program in said computing device to determine said predefined number of assembling parameter optimization runs.

10. The system of claim 7 wherein said program code in said computer device is further configured to verify said optimized parameters for assembling said first and second parts using predetermined indicators.

11. The system of claim 10 wherein said program code in said computing device is further configured to when prompted by said operator of said robot use said optimized and verified parameters for assembling said first and second parts for continuing to assemble said respective one of said first parts to said associated one of said second parts.

12. A system for, during a continuous production run of first and second parts to be assembled together, continuously assembling a respective one of said first parts to an associated one of said second parts, each of said first and second parts to be assembled having an associated starting position and associated parameters for assembling said first and second parts, said system comprising:

an industrial robot for continuously assembling said respective one of said first parts to said associated one of said second parts;

a computing device in communication with said robot, said computing device having therein program code usable by said computing device for controlling said robot to continuously assemble said respective one of said first parts to said associated one of said second parts, said code comprising:

code configured to use said starting position for said first part and said parameters for continuously assembling said first and second parts to continuously assemble said respective one of said first parts to said associated one of said second parts;

code configured to when prompted by an operator of said robot verify, during said continuous assembly of said respective one of said first parts to said associated one of said second parts, said starting position for said first part and/or said parameters for continuously assembling said first and second parts to continuously assemble said respective one of said first parts to said associated one of said second parts using a predefined number of verification experiments; and code configured to process in said computing device the result when completed of said predefined number of experiments.

* * * * *